(12) United States Patent
Hamaoka

(10) Patent No.: US 7,016,274 B2
(45) Date of Patent: Mar. 21, 2006

(54) OPTICAL PICKUP SYSTEM WITH LIGHT RECEIVING PORTION

(75) Inventor: Osamu Hamaoka, Yamatotakada (JP)

(73) Assignee: Sharp Kabushiki Kaisha, Osaka (JP)

( * ) Notice: Subject to any disclaimer, the term of this patent is extended or adjusted under 35 U.S.C. 154(b) by 466 days.

(21) Appl. No.: 10/112,180

(22) Filed: Mar. 27, 2002

(65) Prior Publication Data

US 2002/0141320 A1 Oct. 3, 2002

(30) Foreign Application Priority Data

Mar. 27, 2001 (JP) .............................. 2001-091492

(51) Int. Cl.
*G11B 7/13* (2006.01)
(52) U.S. Cl. ............... 369/44.42; 369/120; 369/112.15
(58) Field of Classification Search ........... 369/112.06, 369/112.07, 112.1, 112.11, 112.12, 112.15
See application file for complete search history.

(56) References Cited

U.S. PATENT DOCUMENTS

| | | | | |
|---|---|---|---|---|
| 4,665,310 A | * | 5/1987 | Heemskerk ............... | 369/44.12 |
| 4,904,856 A | * | 2/1990 | Nagahama et al. ...... | 250/201.5 |
| 4,908,506 A | * | 3/1990 | Coops et al. ............ | 250/201.5 |
| 5,428,595 A | * | 6/1995 | Yoshida et al. ........ | 369/112.04 |
| 5,579,298 A | * | 11/1996 | Opheij et al. .......... | 369/112.04 |
| 5,594,712 A | * | 1/1997 | Yang ........................ | 369/44.23 |
| 5,644,563 A | * | 7/1997 | Yang ....................... | 369/44.23 |
| 5,672,812 A | * | 9/1997 | Meyer ....................... | 73/35.07 |
| 6,125,087 A | * | 9/2000 | Ohnishi et al. .......... | 369/44.23 |

FOREIGN PATENT DOCUMENTS

| | | |
|---|---|---|
| JP | 02-192035 | 7/1990 |
| JP | 2000-322763 | 11/2000 |

OTHER PUBLICATIONS

Japanese Office Action mailed Aug. 12, 2004, for Japanese Patent Application 2001-091492 filed Sep. 22, 1999, two pages.

* cited by examiner

*Primary Examiner*—Brian E. Miller
*Assistant Examiner*—Michael V. Battaglia
(74) *Attorney, Agent, or Firm*—Morrison & Foerster LLP

(57) ABSTRACT

An optical pickup comprises a light source, a three-way split light diffracting section for dividing light emitted from a light source into one main beam and two subbeams, a hologram for dividing each of the main beam and the subbeams reflected from a recording medium into two predetermined directions, and a light receiving section for receiving the beams divided by the hologram. The hologram includes two regions having a small-pitch grating for diffracting each beam to a predetermined direction, the small-pitch gratings have substantially the same pitch and are symmetrical about a split line separating the two regions.

8 Claims, 4 Drawing Sheets

CONVENTIONAL ART

Out of focus (far)

In focus

Out of focus (near)

CONVENTIONAL ART

OPTICAL PICKUP SYSTEM WITH LIGHT RECEIVING PORTION

BACKGROUND OF THE INVENTION

1. Field of the Invention

The present invention relates to an optical pickup used in an optical disk system, such as a compact disk, a video disk, etc. More particularly, the present invention relates to an optical pickup comprising a hologram element-incorporating semiconductor laser device.

2. Description of the Related Art

An optical pickup comprising a semiconductor laser device is used to read out information stored in an optical disk, such as a compact disk, etc. In the optical pickup, light emitted from the semiconductor laser device is split by a diffraction grating of a hologram element into one main beam and two subbeams (tracking beams) which are brought onto an optical disk. The main beam and the subbeams are reflected on the optical disk, and each reflected beam is further split by a hologram of the hologram element into two beams, which are brought to a light receiving element or a signal processing integrated circuit with a light receiving element. Thereafter, based on an output signal from the signal processing integrated circuit, a tracking information signal, etc. used for accurately reading out signals recorded in the optical disk can be obtained.

FIG. 4 is a schematic diagram showing the optical system of a conventional three-beam hologram optical pickup.

This optical pickup has a semiconductor laser chip (LD) 6. Light emitted from the semiconductor laser chip 6 is split by a tracking beam generating diffraction grating 5, provided on the rear side of a hologram element (not shown), into three beams, i.e., two subbeams for tracking and one main beam for reading information signals. This light passes through a hologram 4 provided on the hologram element as zero-order light, and is then converted by a collimator lens 3 to parallel light. The parallel light is condensed by an objective lens 2 onto a disk 1. The light condensed onto the disk 1 is modulated by pits on the disk 1 and reflected from the disk 1. The reflected light from the disk 1 passes through the objective lens 2 and the collimator lens 3 in this order, and is then diffracted by the hologram 4 and introduced into a five-way split photodiode 7 as first-order diffracted light.

This five-way split photodiode 7 has five optical detectors D1 to D5. The five-way split photodiode 7 has a rectangular region which is illuminated by light. The region is divided into three equal parts which are strip regions extending in a longitudinal direction. Two opposite regions are first and fifth optical detectors D1 and D5. A middle strip region is further divided into two equal parts in a transverse direction. One of the two regions is a fourth optical detector D4. The other region is further divided into two parts in a longitudinal direction, which are second and third optical detectors D2 and D3.

The hologram 4 has two regions 4a and 4b which have different grating pitches. The main beam of reflected light entering the region 4a is condensed onto the splitting line between the second optical detector D2 and the third optical detector D3 of the five-way split photodiode 7. The main beam of reflected light entering the region 4b is condensed onto the fourth optical detector D4. Further, the two subbeams of reflected light entering the region 4a are condensed onto the opposite first and fifth optical detectors D1 and D5, so that two beam spots are formed on each of the optical detectors D1 and D5.

As described above, the beam spots of reflected light condensed on the optical detectors D1 to D5 of the five-way split photodiode 7 vary depending on the focusing conditions of the light brought onto the disk 1 as shown in FIGS. 5A to 5C. FIG. 5A shows spots when light is focused beyond the optical disk 1. FIG. 5B shows spots when light is properly focused on the optical disk 1. FIG. 5C shows spots when light is focused before the disk 1.

The outputs of the optical detectors D1 to D5 of the five-way split photodiodes 7 are represented by S1, S2, S3, S4 and S5, respectively. A focus error signal FES is given by the difference between the outputs of the second optical detector D2 and the third optical detector D3:

$FES=S2-S3$

A tracking error is detected by a so-called three-beam method. The tracking subbeams are condensed onto the optical detectors D1 and D5. A tracking error signal TES is given by the difference between the outputs of the optical detectors D1 and D5:

$TES=S1-S5$

A reproduction signal RF is given by the sum of the outputs of the second, third and fourth optical detectors D2, D3 and D4:

$RF=S2+S3+S4$

In a hologram optical pickup using the conventional three-beam method, the hologram 4 includes two regions 4a and 4b having different grating pitches. Light beams which pass through the regions 4a and 4b of the hologram 4 after reflection on the optical disk 1 have different diffraction angles. Therefore, the light beams which have passed through the regions 4a and 4b are diffracted at a smaller angle and a larger angle in one direction with respect to the hologram 4.

The grating of the hologram 4 is typically formed of grooves which are formed by patterning using a photoetching technique. When the two regions 4a and 4b having different grating pitches are formed by patterning, the depth of the grooves and the angle of grating vary in each of the regions 4a and 4b, depending on an etching rate, etc.

If the groove depth and grating angle vary in each of the regions 4a and 4b, the variations appear as the difference in the intensity of diffracted light between the main beam and the subbeams, i.e., the difference in diffraction efficiency. As a result, the optical intensities of reflected light beams entering the optical detectors D1 to D5 are unbalanced, so that offset develops in the tracking error signal TES. In this case, characteristics of the hologram optical pickup are likely to be degraded.

SUMMARY OF THE INVENTION

According to one aspect of the present invention, an optical pickup comprises a light source; a three-way split light diffracting section for dividing light emitted from a light source into one main beam and two subbeams; a hologram for dividing each of the main beam and the subbeams reflected from a recording medium into two predetermined directions; and a light receiving section for receiving the beams divided by the hologram. The hologram includes two regions having a small-pitch grating for diffracting each beam to a predetermined direction, the small-pitch gratings have substantially the same pitch and are symmetrical about a split line separating the two regions.

In one embodiment of this invention, the light receiving section includes a plurality of light receiving portions, the plurality of light receiving portions being symmetrical about a plane including a split line separating the two regions and perpendicular to the hologram.

In one embodiment of this invention, the light receiving section has a light receiving portion and the light receiving portion is not used to detect the beams.

In one embodiment of this invention, the plurality of light receiving sections of the light receiving portion are substantially the same distance from the hologram.

In one embodiment of this invention, the light source, the three-way split light diffracting section, the hologram and the light receiving section are integrated into the optical pickup.

Thus, the invention described herein makes possible the advantages of providing an optical pickup in which the difference in diffraction efficiency between reflected light beams passing through two regions provided in a hologram is reduced so as to reduce the degradation of a characteristic of a tracking error signal TES.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative examples with reference to the accompanying drawings.

Figure 1:
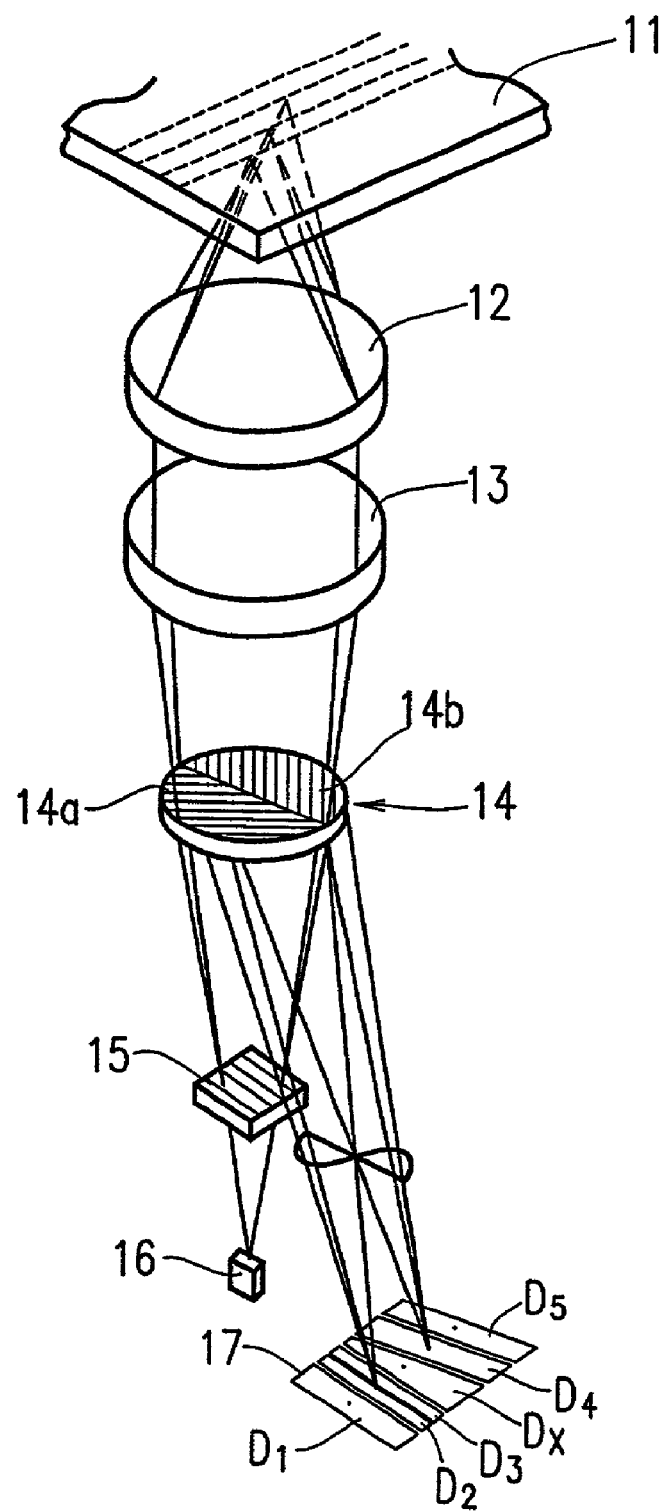
FIG. 1 is a schematic diagram showing the optical system of an optical pickup according to the present invention.

FIG. 1 is a schematic diagram showing the optical system of an optical pickup according to the present invention.

This optical pickup comprises a semiconductor laser chip 16 which emits predetermined light. Light emitted from the semiconductor laser chip 16 is split by a tracking beam generating diffraction grating 15 provided on the rear side of a hologram element (not shown) into three beams, i.e., two subbeams for tracking and one main beam for reading information signals. Those three light beams pass through a hologram 14 provided on the hologram element as zero-order light, and are then converted by a collimator lens 13 into parallel light. The parallel light is condensed by an objective lens 12 onto a disk 11. The light condensed onto the disk 11 is modulated by pits formed on the disk 11 and reflected from the disk 11. The reflected light from the disk 11 passes through the objective lens 12 and the collimator lens 13 in this order, and is then diffracted by the hologram 14 and introduced into a five-way split photodiode 17 as first-order diffracted light.

The hologram 14 is in the shape of a circle, and is divided along a split line on a diameter of the circle into two equal semicircular regions 14a and 14b. The regions 14a and 14b include small-pitch gratings having substantially the same grating pitch. The small-pitch gratings provided in the regions 14a and 14b are arranged to be substantially symmetrical about the split line separating the regions 14a and 14b. Therefore, the small-pitch gratings of the regions 14a and 14b have substantially the same pitch. Therefore, the reflected light beams passing through the regions 14a and 14b of the hologram 14 are diffracted at substantially the same angle toward substantially the same direction, so that the light beams are substantially symmetrical about a plane which includes the split line separating the regions 14a and 14b and is perpendicular to the hologram 14. Therefore, the light beams passing through the regions 14a and 14b of the hologram 14 are separated into two directions as first-order diffracted light beams.

Figure 2:
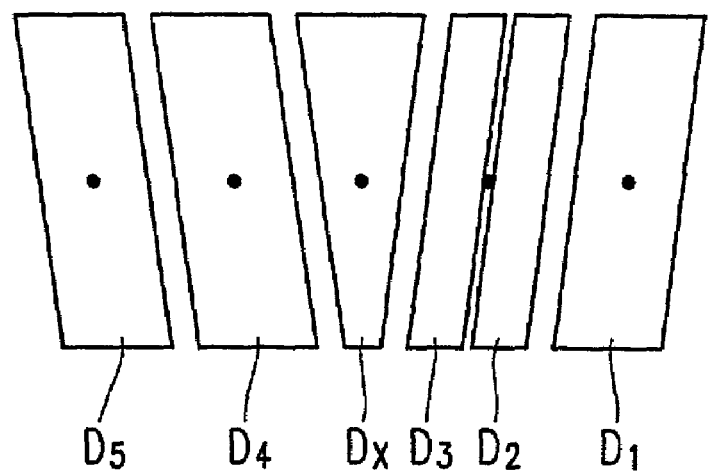
FIG. 2 is a plan view showing an arrangement of optical detectors of a five-way split photodiode according to the present invention.

FIG. 2 is a plan view showing an arrangement of optical detectors D1 to D5 of the five-way split photodiode 17 which reflected light beams enter.

The main beam and the two subbeams are each split into first-order diffracted light beams propagating in two directions by the two regions 14a and 14b of the hologram 14. The optical detectors D1 to D5 are arranged by considering the incident positions of the first diffracted light beams. The first to fifth optical detectors D1 to D5 are arranged on the same plane and along a direction orthogonal to the split line splitting the hologram 14 into the two regions 14a and 14b. The first and fifth optical detectors D1 and D5 onto which two subbeams passing through the region 14a are brought are positioned on the opposite sides of the photodiode 17. A pair of the second and third optical detectors D2 and D3, onto which the main beam passing through the region 14a of the hologram 14 is brought, are provided next to the first optical detector D1. The fourth optical detector D4, onto which the main beam passing through the region 14b of the hologram 14 is brought, is provided next to the fifth optical detector D5. The first and fifth optical detectors D1 and D5 are in the shape of a parallelogram extending in a direction along which the subbeams are diffracted, and are substantially symmetrical about a plane which includes the split line of the hologram 14 and is perpendicular to the hologram 14. The distance between the first and fifth optical detectors D1 and D5 is increased the further their positions from the hologram 14. The fourth optical detector D4 provided next to the fifth optical detector D5 is in the shape of a parallelogram similar to the fifth optical detector D5. The second and third optical detectors D2 and D3 are in the shape of parallelograms obtained by dividing a parallelogram, which is substantially symmetrical to the fourth optical detector D4 about a plane which includes the split line of the hologram 14 and is perpendicular to the hologram 14, into substantially two equal parts in a longitudinal direction.

Further, an optical detector Dx is provided between the third and fourth optical detectors D3 and D4, which is used to prevent the occurrence of stray light, which affects the outputs of the optical detectors D1 to D5. The optical detector Dx does not detect the main beam and subbeams. The optical detector Dx is in the shape of a trapezoid such that the width is broadened the further its position from the hologram 14. The position of the optical detector Dx is such that the optical detector Dx seemingly buffers a region between the third and fourth optical detectors D3 and D4.

The longitudinal length of each optical detector D1 to D5 is designed to be greater than a range within which the incident position of reflected light varies depending on the wavelength which varies as the temperature of a light source is changed, so that the desired outputs of the optical detectors D1 to D5 can be obtained. It should be noted that if the lengths of the optical detectors D1 to D5 are longer than that required, the capacitive components of the optical detectors D1 to D5 are large, leading to a reduction in response speed. The lengths of the optical detectors D1 to D5 are determined by considering the precision of positioning. Further, since each of the optical detectors D1 to D5 is in the shape of a parallelogram, a wastage of space is reduced when compared to the case where each detector is in the shape of a rectangle extending along the same direction as that of the parallelogram. Therefore, peripheral circuits, such as an amplifying circuit, etc., can be easily arranged.

The main beam of reflected light from the disk 11 is passed through the regions 14a and 14b of the hologram 14 so that the main beam is diffracted into directions substantially symmetrical about the split line separating the regions 14a and 14b and the split beams form respective beam spots between the second and third optical detectors D2 and D3 of the five-way split photodiode 17, and the fourth optical detector D4. The two subbeams are passed through the regions 14a and 14b of the hologram 14 so that the subbeams are diffracted into directions substantially symmetrical about the split line separating the regions 14a and 14b and the split subbeams form respective beam spots on the first and fifth optical detectors D1 and D5 on the opposite sides of the five-way split photodiode 17.

As described above, in the optical pickup of the present invention, the hologram 14, which divides reflected light from the optical disk 11 into two parts, has two grating regions 14a and 14b whose grating pitches are substantially equal to each other. Therefore, the variations in the depth of the small-pitch grating and the angle of the grating between the regions 14a and 14b can be reduced, so that the differences in the intensity of the diffracted light (i.e., diffraction efficiency) of the main beam and the subbeams can be reduced between the regions 14a and 14b. As a result, characteristics of the optical pickup can be prevented from being degraded. Particularly, it is possible to improve the balance characteristic of a tracking error signal TES.

Figure 3:
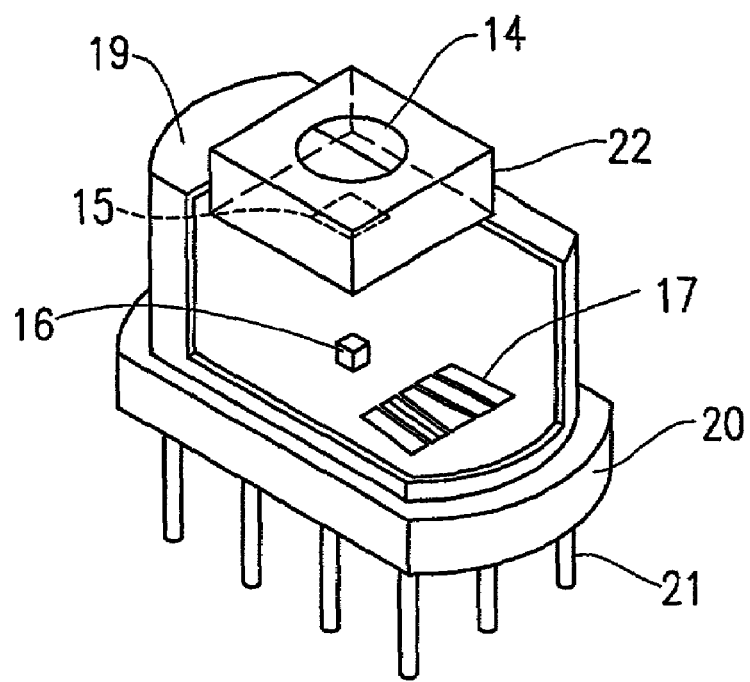
FIG. 3 is a schematic diagram showing a specific configuration of an optical pickup according to the present invention.
Figure 4:
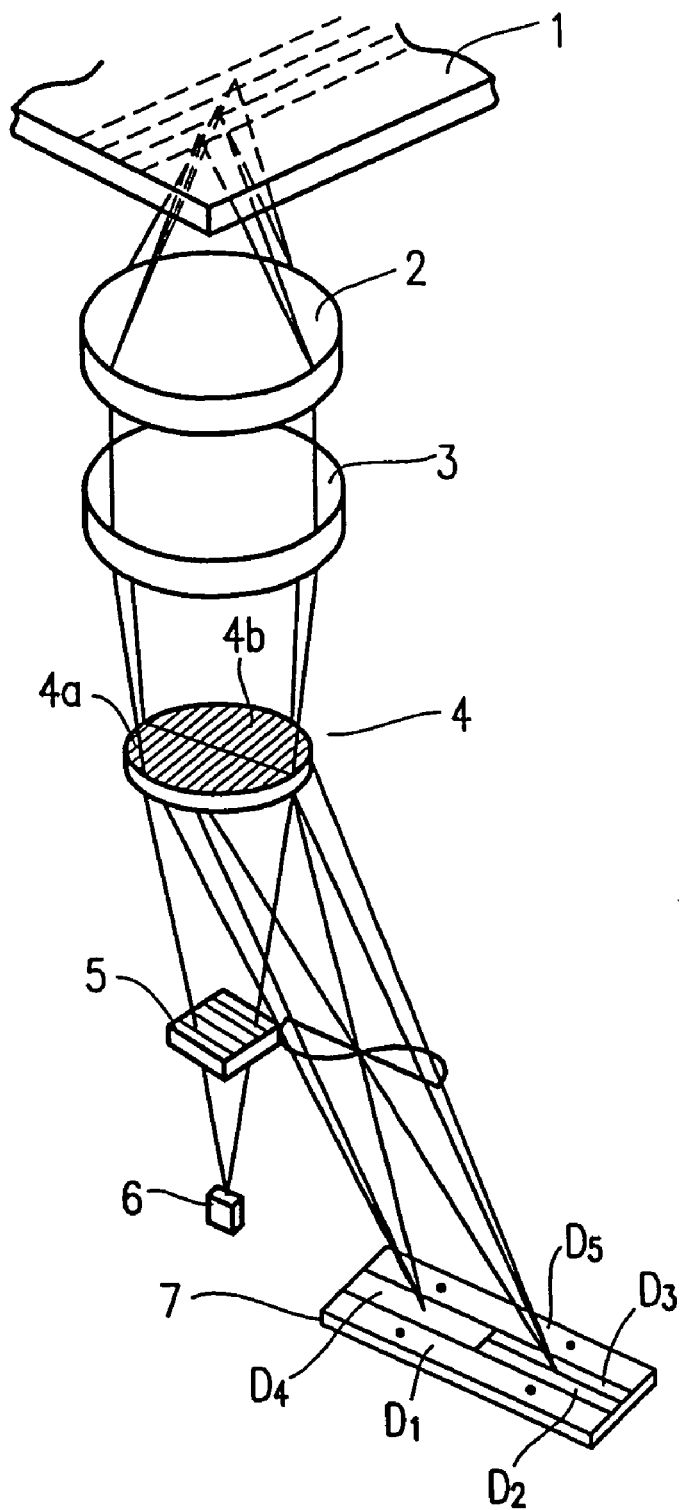
FIG. 4 is a schematic diagram showing the optical system of a conventional optical pickup.
Figure 5A:
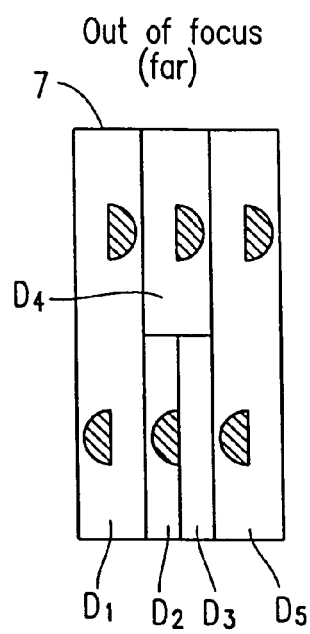
FIG. 5A is a plan view of an arrangement of the optical detectors in a conventional five-way split photodiode, showing spots when light is focused beyond an optical disk.
Figure 5B:
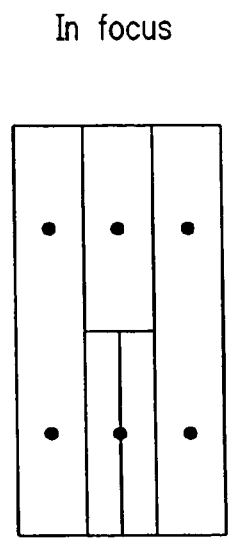
FIG. 5B is a plan view of an arrangement of the optical detectors in a conventional five-way split photodiode, showing spots when light is properly focused on an optical disk.
Figure 5C:
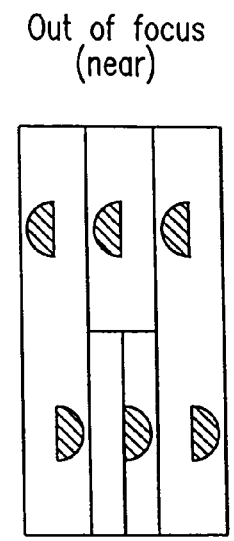
FIG. 5C is a plan view of an arrangement of the optical detectors in a conventional five-way split photodiode, showing spots when light is focused before an optical disk.

FIG. 3 is a schematic diagram showing a specific configuration of an optical pickup according to the present invention.

This optical pickup has a plate-like stem 20 which is supported via a plurality of lead pins 21 by an optical disk apparatus body. A semiconductor laser chip 16 and a five-way split photodiode 17 are mounted on a surface of the stem 20. The semiconductor laser chip 16 and the five-way split photodiode 17 are connected via wiring (not shown) to the optical disk apparatus. A hollow cap 19 is provided on the top side of the stem 20 f or covering the semiconductor laser chip 16 and the five-way split photodiode 17 to block light. A hologram element 22 is provided on the top wall of the cap 19. A tracking beam generating diffraction grating 15 is provided on the lower side of the hologram element 22. A hologram 14 is provided on the upper side of the hologram element 22.

The thus-obtained optical pickup is a package into which the hologram element 22, the semiconductor laser 16, the photodiode 17, etc. are integrated, resulting in miniaturization of the optical pickup. Further, the production processes of such an optical pickup can be simplified.

In the optical pickup of the present invention, the hologram has two regions having a small-pitch grating which diffracts light into a predetermined direction. The small-pitch gratings have substantially the same pitch and are substantially symmetrical about a split line separating the two regions. Therefore, variations in the depth and angle of the small-pitch gratings can be reduced between the two regions. In this case, the differences in the intensity of the diffracted light (i. e., diffraction efficiency) of a main beam and subbeams can be reduced between the two regions. Therefore, characteristics of the optical pickup can be prevented from being degraded. Particularly, it is possible to improve the balance characteristic of a tracking error signal TES.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An optical pickup, comprising:
   a light source;
   a three-way split light diffracting section for dividing light emitted from a light source into one main beam and two sub beams;
   a hologram for dividing each of the main beam and the sub beams reflected from a recording medium into two predetermined directions; and
   a light receiving section for receiving the beams divided by the hologram comprising a plurality of light receiving portions arranged symmetrically about a central light receiving portion that is not used to detect the beam or sub beam,
   wherein the central light receiving portion is used to prevent the occurrence of stray light, and
   wherein the hologram includes two regions having a small-pitch grating for diffracting each beam to a predetermined direction, the small-pitch gratings have substantially the same pitch and are symmetrical about a split line separating the two regions.

2. An optical pickup according to claim 1, wherein the plurality of light receiving portions are positioned at substantially the same distance from the hologram.

3. An optical pickup according to claim 1, wherein the light source, the three-way split light diffracting section, the hologram and the light receiving section are integrated into the optical pickup.

4. The optical pickup of claim 1 wherein the length of the light receiving section in a direction extending from the hologram is approximately the same as or greater than the distance over which the incident light varies as the wavelength of the light source varies.

5. The optical pickup of claim 1 wherein the distance between the light receiving portions is dependent upon the distance of the light receiving sections from the hologram.

6. The optical pickup of claim 1 wherein the light receiving portions used to detect the beam or sub beam comprise parallelograms.

7. The optical pickup of claim 6 wherein the parallelograms comprise non-rectangular parallelograms.

8. An optical pickup according to claim 1, wherein
   the central light receiving portion is in a shape of a trapezoid such that a width of the central light receiving portion is broadened as its position from the hologram is increased, and
   the position of the central light receiving portion is such that the central light receiving portion substantially covers a region between two of the plurality of light receiving portions arranged symmetrically about the central light receiving portion.

* * * * *